United States Patent [19]
Bleimann et al.

[11] Patent Number: 4,525,139
[45] Date of Patent: Jun. 25, 1985

[54] BURNER IN A DRUM

[75] Inventors: Karl R. Bleimann, Matthews; Michael J. Fookes, Salisbury; Richard W. McVicker; John W. Munn, both of Charlotte; Eugene R. Nelson, Spencer, all of N.C.

[73] Assignee: Fuchs Systems, Inc., Salisbury, N.C.

[21] Appl. No.: 562,641

[22] Filed: Dec. 19, 1983

[51] Int. Cl.³ .............................................. F23C 5/06
[52] U.S. Cl. .................................... 431/189; 431/160
[58] Field of Search ....................... 431/160, 186, 189; 266/186, 189, 222

[56] References Cited

U.S. PATENT DOCUMENTS 1,768,940  7/1930  Sweatt et al. ...................... 431/166
3,100,461  8/1963  Werner .............................. 431/160

FOREIGN PATENT DOCUMENTS 2083608  3/1982  United Kingdom ................ 431/189

Primary Examiner—Carroll B. Dority, Jr.
Attorney, Agent, or Firm—Ralph H. Dougherty

[57] ABSTRACT

A burner apparatus for introducing auxilliary heat into a furnace, particularly for metallurgical heating and melting.

The apparatus includes a gland which fits into a wall of a furnace, a drum-like device which fits into a mating opening in the gland, a burner sleeve in the drum for receiving a burner such as an oxy-fuel burner and directing the burner flame into the interior of the furnace. The drum and the integral burner are rotatable about an axis. Rotation of the drum moves the burner into the operative position or into the standby position clear of the furnace. Provision is made for oscillating the drum and burner during the heating operation.

16 Claims, 10 Drawing Figures

4,525,139

BURNER IN A DRUM

BACKGROUND OF THE INVENTION

This invention relates to burners for use in metallurgical furnaces. More particularly, it relates to burners for use in melting charge materials, and providing auxilliary heat to metallurgical refining furnaces. Such burners are especially useful in electric arc steelmaking furnaces. Although the burners can be used in many metallurgical heating and melting apparatuses, the invention will be described with regard to electric arc steelmaking furnace applications.

Burners, particularly of the oxy-fuel type, are well known in the metallurgical industry and particularly in steel making. Such burners are described in U.S. Pat. No. 3,701,517 and others.

OBJECTS OF THE INVENTION

It is the priminary object of this invention to provide an oxy-fuel burner for a high heat application which is suitable for melting of steel scrap within an electric arc steelmaking furnace.

It is another object of this invention to provide a burner which can be readily removed from its operative position in a furnace wall without leaving an unguarded opening in the furnace wall.

It is also an object of this invention to provide an oxy-fuel burner which can be repaired, replaced, or maintained while the burner assembly remains affixed to a metallurgical furnace.

It is also an object of this invention to provide a burner assembly which is capable of directing the burner flame through a specified arc within the furnace.

It is another object of this invention to provide a burner which is capable of being utilized in sidewalls and/or roofs of a metallurgical heating or melting furnace, and even in the bottom wall of a non-melting metallurgical furnace such as an annealing furnace.

SUMMARY OF THE INVENTION

The apparatus of the invention includes a barrel-like or drum-like portion which fits into a mating opening in a gland positioned in a wall of a metallurgical furnace. A burner such as an oxy-fuel burner is situated within a burner sleeve in this drum. The apparatus is preferably oriented in the side wall of a furnace, with the burner tip downwardly inclined. The burner is rotatable about an axis which passes through the drum. The rotation of the drum moves the burner into the operative position directed to the interior of the furnace, or into the standby position clear of the furnace. While in the standby position, the face portion of the drum fills the vacated opening of the gland to form a closure member for the opening. The interior opening of the gland preferably has a knife edge thereon to provide a close fit with the drum face and to scrape off any solidified particles of slag or metal from the face of the drum. The tight fit between the gland and the drum prevents escape of heat and flame from the furnace into the region of the burner, rendering it possible for maintenance personnel to perform any type of operation necessary to maintain, repair, or replace the components of the burner or any related mechanism in the standby position, while being protected from the high furnace heat and flame.

BRIEF DESCRIPTION OF THE DRAWINGS

This invention is better understood when referring to the following detailed description and the appended drawings in which.

DETAILED DESCRIPTION

Figure 1:
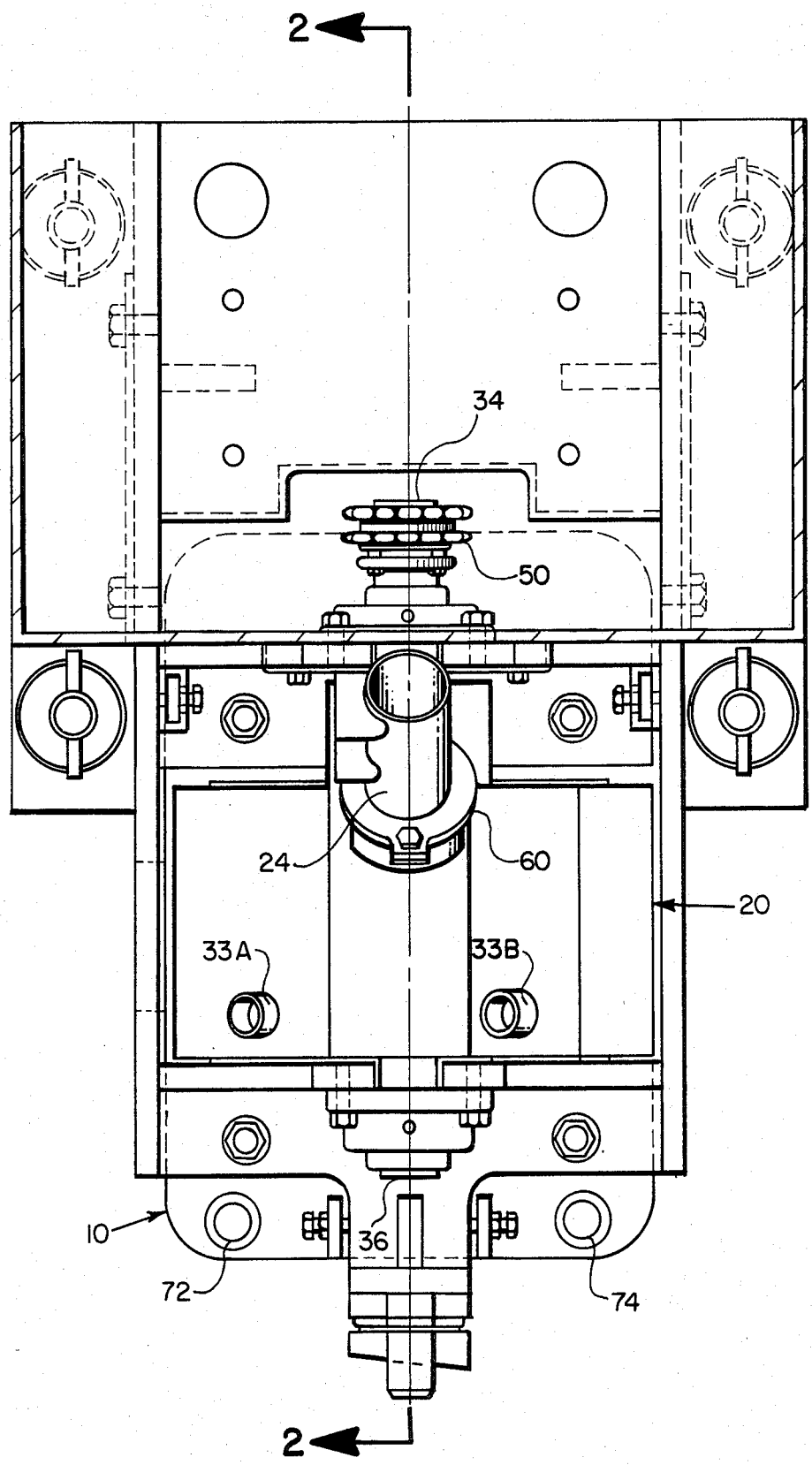
FIG. 1 is a front view of the invented apparatus as mounted exterior to a metallurgical melting furnace.
Figure 2:
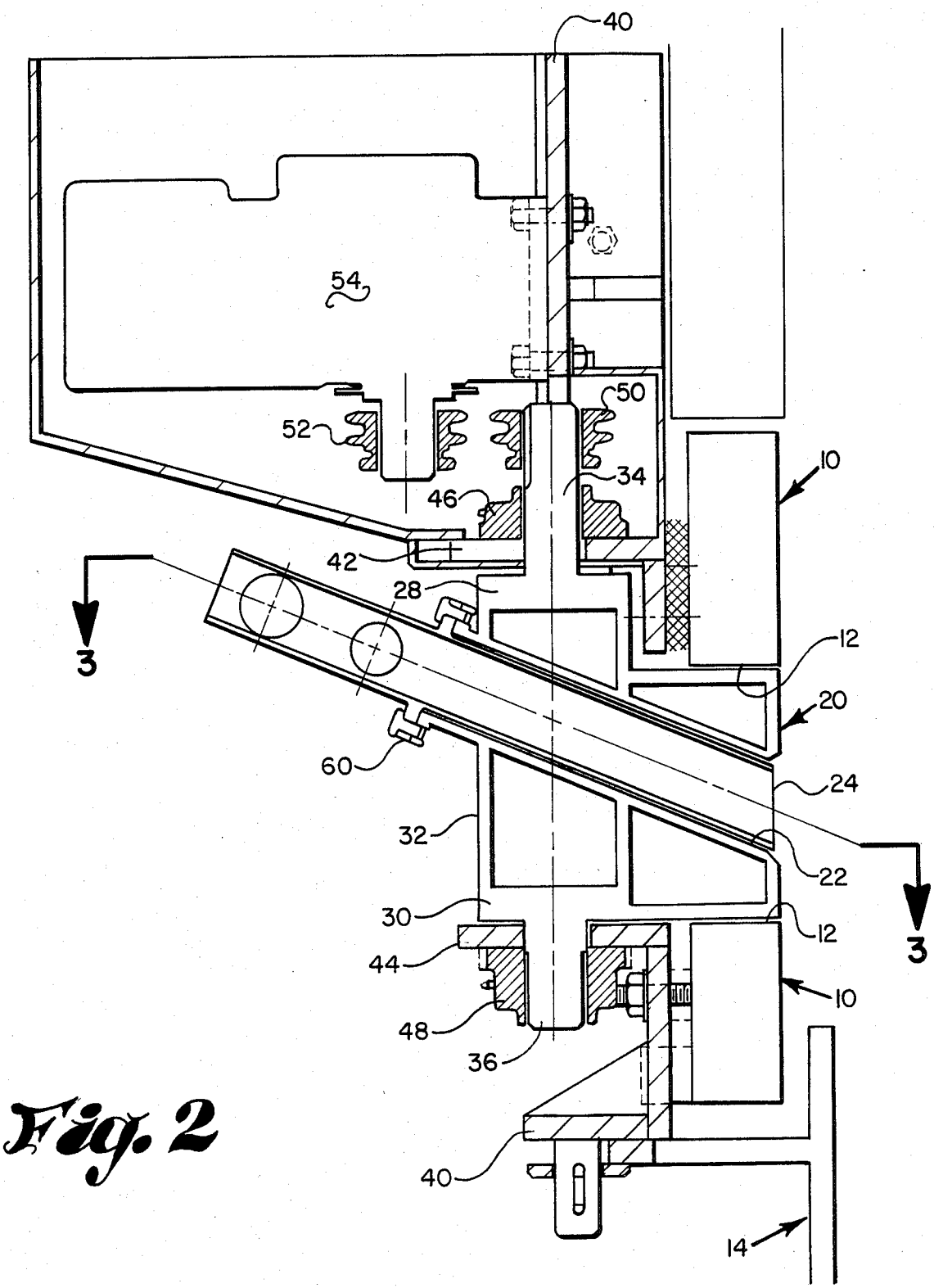
FIG. 2 is a sectional view of the apparatus of FIG. 1 taken along the line 2—2 of FIG. 1.
Figure 3:
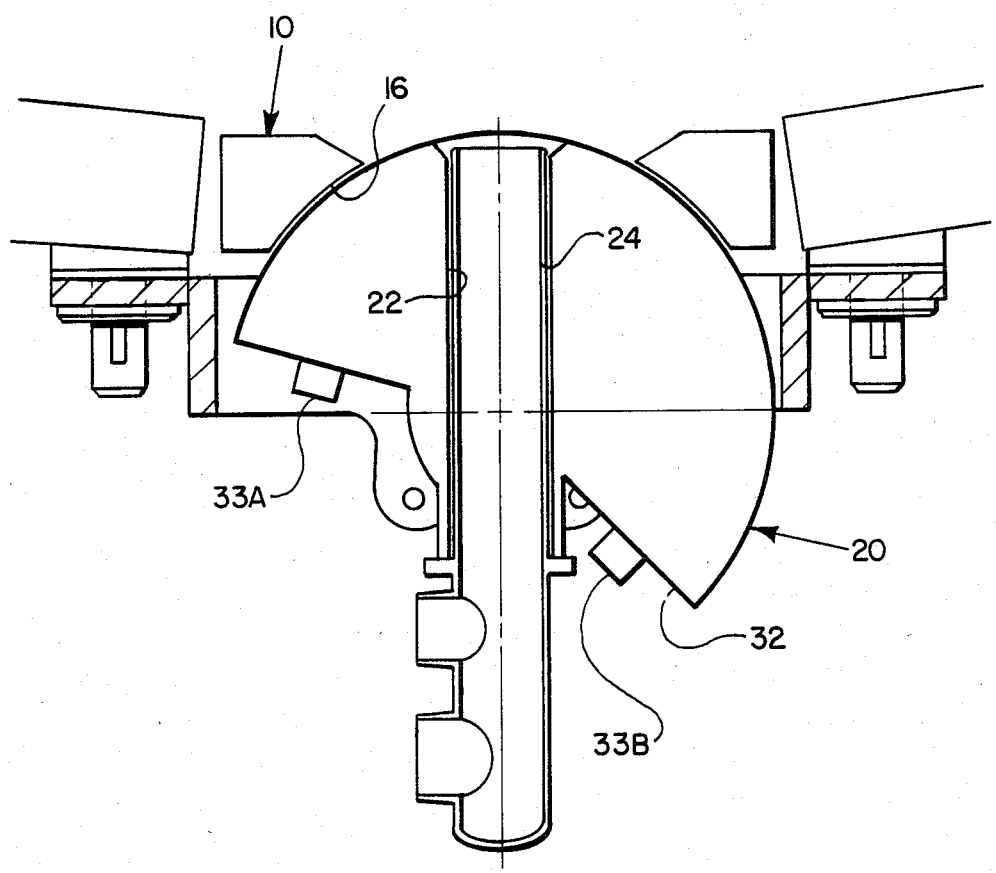
FIG. 3 is an inclined sectional view of the invented apparatus taken along the line 3—3 of FIG. 2.
Figure 4:
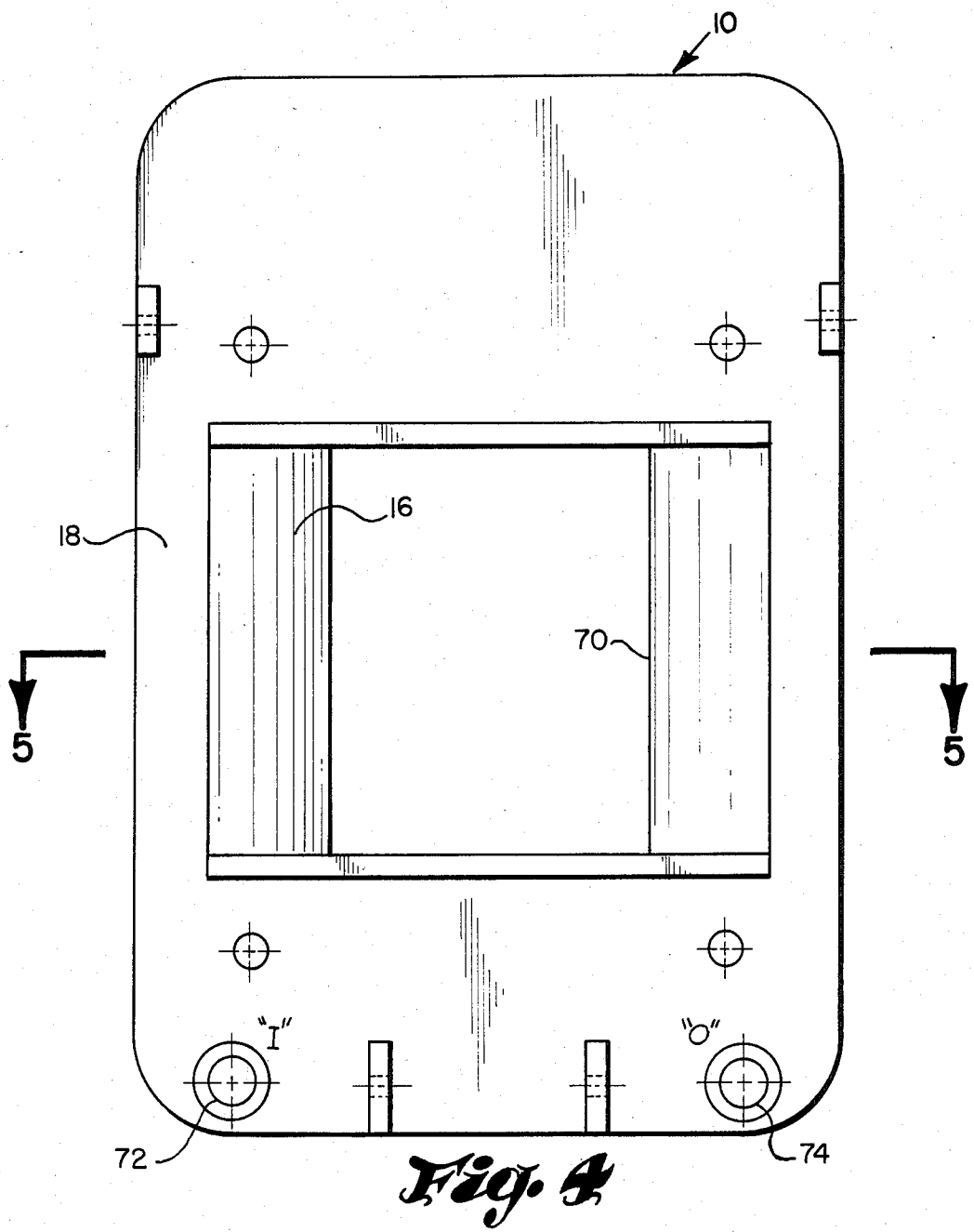
FIG. 4 is a front view of a gland for receiving the cylindrical style burner apparatus.
Figure 5:
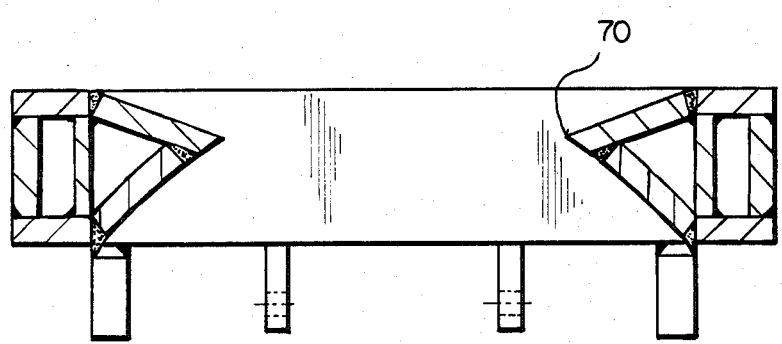
FIG. 5 is a sectional view of the gland of FIG. 4 taken along the line 5—5 of FIG. 4.

Referring now to FIGS. 1 and 2, a fluid-cooled gland 10 having an opening 12 therein is positioned in the side wall 14 of a metallurgical melting furnace, such as an electric arc furnace. The gland has arcuate surfaces 16 on the inside of the upright sections 18 of the gland, as best shown in FIGS. 4 and 5, to receive and mate with the curved surface of drum 20. The drum is generally cylindrical, but is preferably a portion of a cylinder as shown in FIG. 3. The cylindrical portion is at least 180° of a circle, and preferably a few degrees more. The arcuate surfaces 16 of the gland have the same radius as the cylindrical portion of the drum 20, which provides a tight fit between these surfaces. The drum is provided with a sleeve 22, preferably inclined, which is adapted to receive burner 24. The sleeve extends through the drum from the arcuate face through the back plate, and preferably passes through the axis of the cylinder. The drum preferably has end plates 28 and 30, and a back plate 32, which form a chamber within the drum. This chamber can have a cooling fluid passed through it to maintain a low temperature on the drum face. Suitable cooling fluids include a cooling gas such as air and a cooling liquid such as water. Water is most generally used for cooling the invented apparatus, but it will be understood that throughout this application, any other cooling fluid can be substituted for the cooling water. Water inlet 33A and outlet 33B are provided for cooling water circulation. A pivot pin 34, coaxial with drum 20, extends from end plate 28, and a second pivot pin 36, also coaxial with drum 20 extends from end plate 30. Mounting frame 40 is fixed to the furnace shell or side wall 14. The mounting frame is provided with upper and lower bearing plates 42 and 44 respectively, which are adapted to receive pivot pins 34 and 36. Thrust bearings, such as roller bearings 46, 48 are provided for the pivot pins.

One of the pivot pins is provided with means for rotating it, and the drum, through a specified arc.

Sprocket 50 engages pivot pin 34, and is connected to sprocket 52 on a rotary actuator 54 by a drive chain, which has been removed from the drawings for clarity. The rotary actuator is a reversible drive mechanism.

The burner assembly is held in place within sleeve 22 by barrel mounts 60. Any burner, such as oxy-fuel, oxy-gas, oxy-oil or other desired burner may be employed in the invented apparatus. We preferably utilize a water-cooled, oxy-fuel burner for electric arc furnace applications.

The gland 10, better shown in FIGS. 4 and 5, is preferably made of copper to dissipate heat readily. The gland has a knife edge 70 for removing any splash or spatter of slag or molten metal from the face of the drum 20. The gland is cooled by any suitable cooling fluid, such as water, the cooling fluid being being introduced and removed through access holes 72 and 74.

In operation, the gland is positioned within an opening in a furnace wall. The mounting plate is affixed to the furnace shell, and the drum positioned thereon, with a reversible drive mechanism attached to one of the pivot pins. A burner is positioned in the burner sleeve, and retained in place by barrel mounts. The drum is rotated into the operative position with the flame end of the burner within the gland opening directed into the furnace interior. The burner is ignited to direct additional heat into the interior of the furnace.

FIGS. 1, 2 and 3 show the burner centered in the operative position. In the standby position, the burner is rotated counterclockwise about 45 to 90 degrees from the position depicted.

The drum can be rotated to direct the burner flame toward any desired spot within the limits of movement defined by the with of the gland opening. By setting limit switches, the drum can be made to oscillate within a given arc, thus swivelling the burner to heat an area rather than a single spot.

ALTERNATIVE EMBODIMENTS

Figure 6:
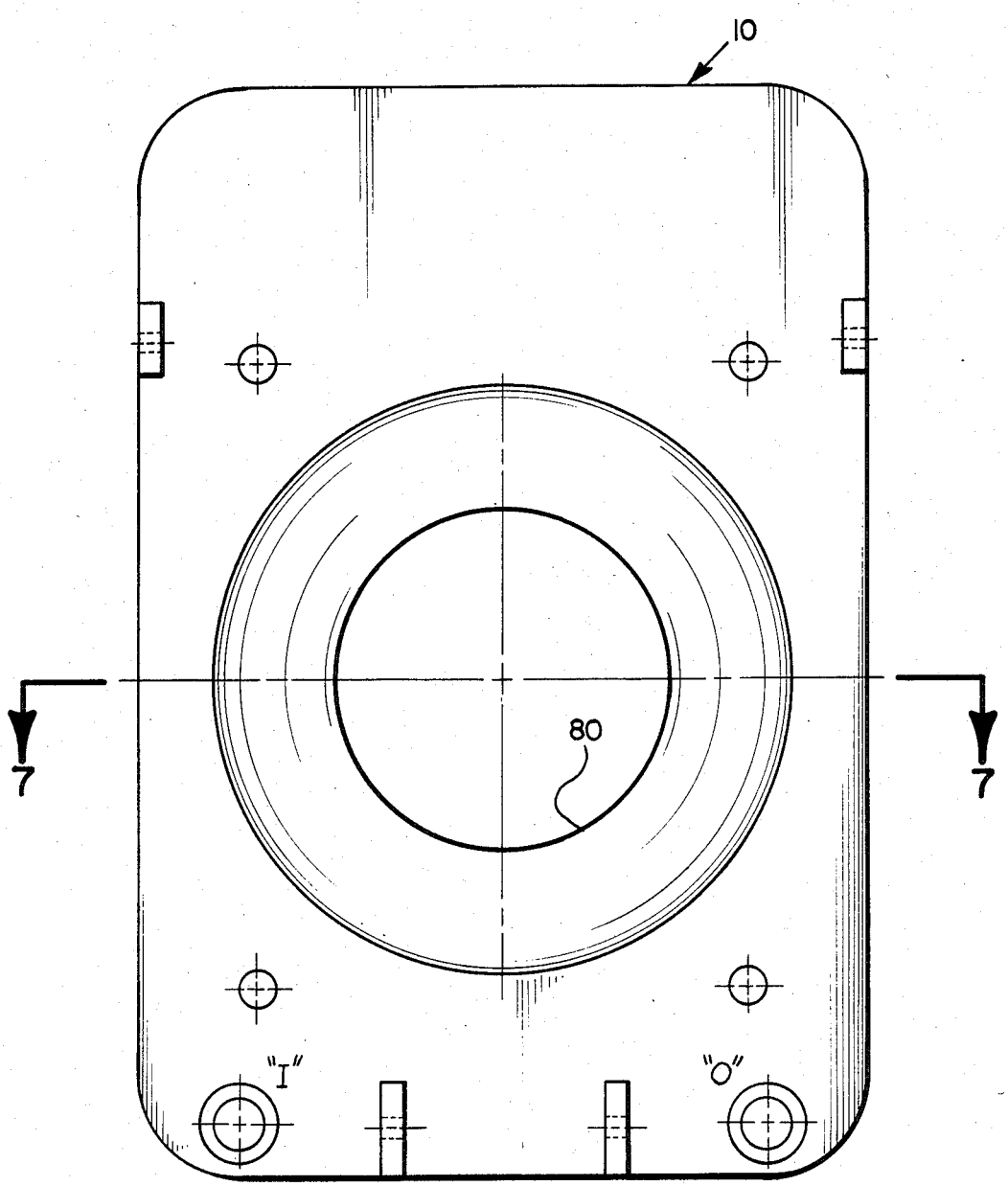
FIG. 6 is a front view of a gland for receiving the spherical style burner apparatus.
Figure 7:
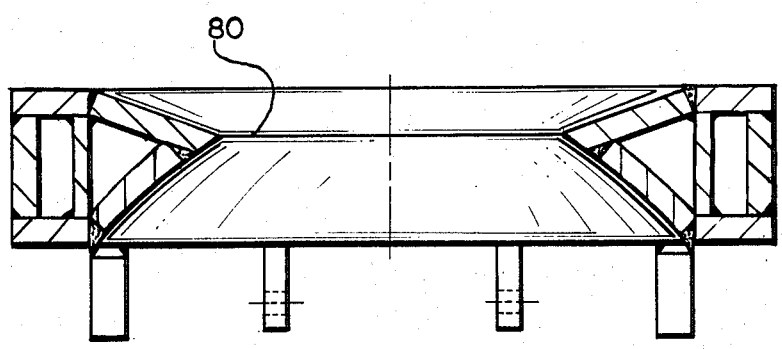
FIG. 7 is a sectional view of the gland of FIG. 6 taken along the line 7—7 of FIG. 6.

The present invention could employ a spherical drum, rather than a cylindrical drum. In such case, the gland would be adapted to receive the spherical surface of the drum as shown in FIGS. 6 and 7. The gland would have a circular opening with a knife edge 80 surrounding the opening. The radius of the mating surface of the gland would be the same as that of the spherical drum. Of course, the drum could be formed by only a portion of a sphere, in the same manner as the preferred embodiment utilized only a portion of a cylinder to form the drum.

Arrangement can be made for mounting the drum so that is will oscillate in two directions, particularly when a spherical drum is used. In this case, the pivot pins would be journaled in a frame which is itself journaled for rotation on secondary pivot pins at right angles to the first pair of pivot pins.

By employing a second drive mechanism about an axis normal to the axis of the first pair of pivot pins, the burner could be tilted about two axes at right angles to each other, which would allow the burner to be directed toward any desired area of the furnace. This arrangement would allow the burner to create a cone of heat within the furnace by oscillating in two directions, similar to the manner in which a gun turret moves.

Although the invention has been described as a drum pivotal about a vertical axis, that axis could be oriented horizontally, or at any selected angle, depending on the desired orientation for replacing the burner or performing maintenance thereon, or whether the burner is installed on a wall or roof.

Figure 8:
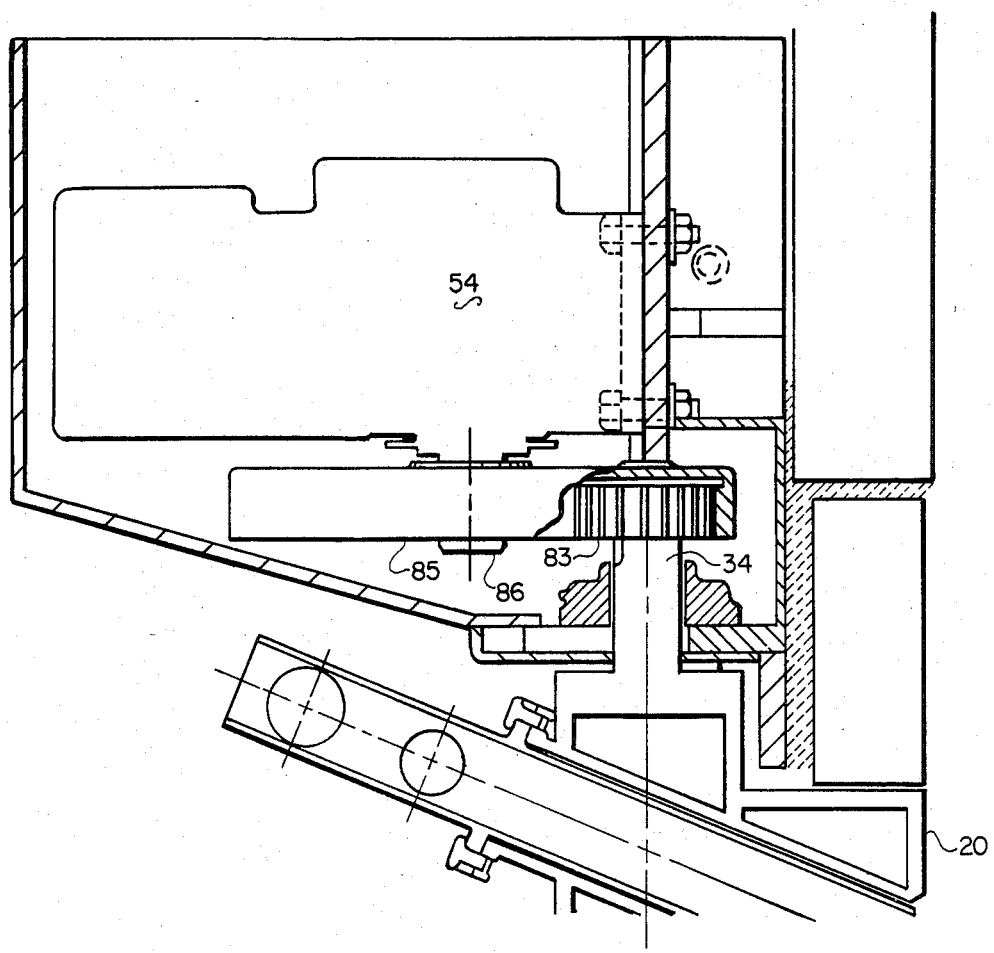
FIG. 8 is a sectional view of an alternative embodiment of the apparatus utilizing a ring and pinion gear drive.
Figure 9:
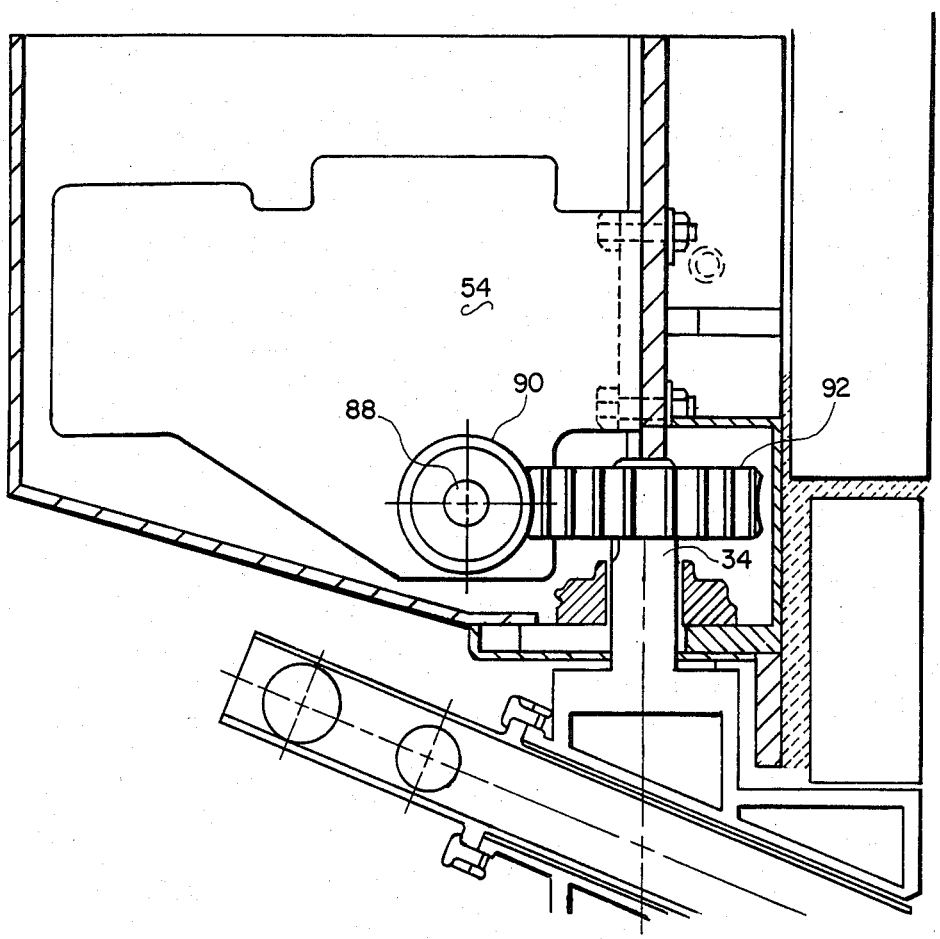
FIG. 9 is a sectional view of another alternative embodiment of the apparatus of FIG. 1 utilizing a worm gear drive.
Figure 10:
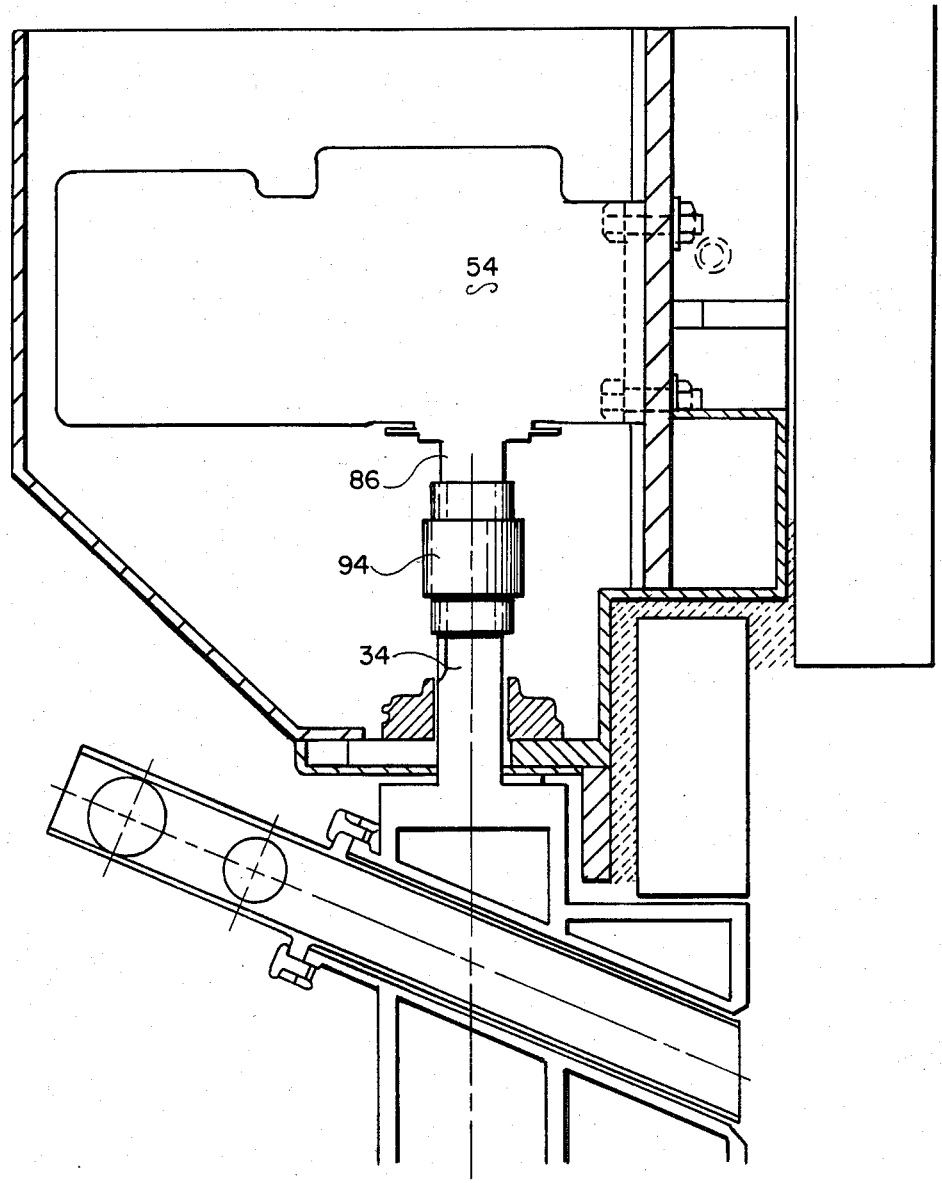
FIG. 10 is a sectional view of yet another alternative embodiment of the apparatus of FIG. 1 utilizing a direct drive.

The shaft drive has been shown as a chain drive, but any suitable reversible drive mechanism could be utilized. A ring and pinion gear drive arrangement is shown in FIG. 8. Ring gear 83 is attached to pivot pin 34 while pinion gear 85 is attached to drive shaft 86 of reversible drive motor 54. A worm gear shaft drive arrangement is shown in FIG. 9. In this case, drive shaft 88 is horizontal to accommodate the worm gear 90 attached thereto. Pivot pin 34 carries an associated drive gear 92, which is engaged by the worm gear. FIG. 10 shows a direct drive arrangement wherein pivot pin 34 is directly coupled to drive shaft 86 of drive motor 54 by a disconnectable coupling 94. The drive mechanism could be operated by electrical, hydraulic, pneumatic, or other suitable means and can be coupled directly to the pivot pin or to the drum shaft.

SUMMARY OF THE ACHIEVEMENT OF THE OBJECTS OF THE INVENTION

It is clear from the foregoing that we have invented a burner apparatus for a high heat application which is suitable for the melting of steel scrap within an electric arc steel making furnace, which can be readily removed from its operative position in a furnace wall without leaving an unguarded opening in the furnace wall, which can be repaired, replaced, or maintained while the burner assembly remains affixed to a metallurgical furnace, and which is capable of directing the burner flame through a specified arc within the furnace.

Although preferred and alternative embodiments have been shown and described in accordance with the patent statutes, it should be understood that various modifications and additions may be made thereto by those skilled in the art without departing from the spirit and scope of the invention as set forth in the following claims.

What is claimed is:

1. A burner assembly comprising:
    a gland having an opening therethrough;
    a mounting frame;
    a drum having a curved face, said drum being adapted to fit in to the opening in said gland;
    a pivot pin extending from each end of said drum, engageable in said mounting frame and adapted to be journaled for rotation therein;
    said drum being provided with a tubular sleeve extending from the curved face through the opposite wall of said drum; and
    reversible drive means engageable with one of said pivot pins for rotating said pivot pin and said drum through an arc.

2. A burner assembly according to claim 1 further comprising a burner removably positionable within said sleeve.

3. Apparatus according to claim 1 wherein said curved face of said drum is at least a portion of a cylinder.

4. Apparatus according to claim 1 wherein said curved face of said drum is at least a portion of a sphere.

5. Apparatus according to claim 1 wherein said drum is enclosed to form a cooling chamber therein.

6. Apparatus according to claim 1 further including flange blocks affixed to said mounting plate for receiving said pivot pins.

7. Apparatus according to claim 1 wherein said gland is provided with a cooling chamber therein.

8. Apparatus according to claim 1 wherein the opening of said gland has a knife edge for creating a tight seal with said drum.

9. Apparatus according to claim 2 wherein said burner is selected from the group consisting of oxy-oil burners, oxy-gas burners, and other oxy-fuel burners.

10. Apparatus according to claim 5 wherein said drum is water cooled.

11. Apparatus according to claim 1 wherein said reversible drive means comprises a drive motor connected to said pivot pin by a chain and sprocket.

12. Apparatus according to claim 1 wherein said reversible drive means comprises a ring and pinion gear.

13. Apparatus according to claim 1 wherein said reversible drive means comprises a worm gear.

14. Apparatus according to claim 1 wherein said reversible drive means is a reversible motor coupled directly to one of said pivot pins.

15. A metallurgical furnace arrangement wherein the apparatus of claim 1 is positioned in a wall of said furnace.

16. A method of placing auxiliary heat in a furnace having a sidewall and an opening in said sidewall, comprising: positioning a rotatable drum having a burner sleeve therein within said opening with the burner sleeve positioned to be out of engagement with said wall opening; placing a burner within said burner sleeve; rotating the drum and burner into an operating position in which said burner is directed through said wall opening into the location within the furnace where additional heat is desired; activating the burner to generate such additional heat; and rotating said drum and burner out of the operating position into a stand-by position whereby the opening in the furnace wall is closed by the drum and the burner accessible exterior of the furnace.

* * * * *